(12) United States Patent
Baehrle-Miller et al.

(10) Patent No.: US 9,802,586 B2
(45) Date of Patent: Oct. 31, 2017

(54) METHOD FOR PROVIDING THE CLAMPING FORCE APPLIED BY A PARKING BRAKE

(71) Applicant: Robert Bosch GmbH, Stuttgart (DE)

(72) Inventors: Frank Baehrle-Miller, Schoenaich (DE); Dieter Blattert, Kirchheim/Neckar (DE); Hubertus Wienken, Langenbrettach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 722 days.

(21) Appl. No.: 13/779,186

(22) Filed: Feb. 27, 2013

(65) Prior Publication Data

US 2013/0226423 A1    Aug. 29, 2013

(30) Foreign Application Priority Data

Feb. 27, 2012   (DE) .................. 10 2012 202 960

(51) Int. Cl.
*B60T 7/12*   (2006.01)
*B60T 7/10*   (2006.01)
*B60T 13/74*  (2006.01)

(52) U.S. Cl.
CPC ............. *B60T 7/12* (2013.01); *B60T 7/107* (2013.01); *B60T 7/108* (2013.01); *B60T 7/122* (2013.01); *B60T 13/741* (2013.01); *B60T 2201/06* (2013.01)

(58) Field of Classification Search
None
See application file for complete search history.

(56) References Cited

U.S. PATENT DOCUMENTS

| | | | |
|---|---|---|---|
| 6,382,741 B1 | 5/2002 | McCann et al. | |
| 2006/0267402 A1* | 11/2006 | Leiter et al. ................... | 303/20 |
| 2007/0029876 A1* | 2/2007 | Makishima et al. .......... | 303/191 |
| 2007/0084682 A1* | 4/2007 | Griffith ..................... | B60T 8/00 188/156 |
| 2008/0264740 A1* | 10/2008 | Usui .......................... | 188/73.31 |
| 2009/0198427 A1* | 8/2009 | Christopher Jackson et al. ............................. | 701/70 |
| 2010/0017070 A1* | 1/2010 | Doering ................ | B60W 30/04 701/48 |
| 2010/0051395 A1* | 3/2010 | Sano et al. .................... | 188/162 |
| 2011/0042171 A1* | 2/2011 | Knechtges ................ | 188/106 F |

FOREIGN PATENT DOCUMENTS

| | | |
|---|---|---|
| DE | 103 61 042 | 5/2005 |
| DE | 10 2011 003 183 | 7/2012 |
| JP | 2005507823 A | 3/2005 |
| JP | 2009280083 A | 12/2009 |
| WO | 2012019821 A1 | 2/2012 |

* cited by examiner

*Primary Examiner* — Rami Khatib
*Assistant Examiner* — Nicholas K Wiltey
(74) *Attorney, Agent, or Firm* — Norton Rose Fulbright US LLP; Gerard Messina

(57) ABSTRACT

In a method for providing the clamping force generated by a parking brake, the roadway incline is measured and in the case that the roadway incline exceeds a threshold value, a reengagement process is carried out after a defined time period has elapsed.

21 Claims, 2 Drawing Sheets

METHOD FOR PROVIDING THE CLAMPING FORCE APPLIED BY A PARKING BRAKE

RELATED APPLICATION INFORMATION

The present application claims priority to and the benefit of German patent application no. 10 2012 202 960.5, which was filed in Germany on Feb. 27, 2012, the disclosure of which is incorporated herein by reference.

FIELD OF THE INVENTION

The present invention relates to a method for providing the clamping force applied by a parking brake in a vehicle.

BACKGROUND INFORMATION

Electromechanical parking brakes having an electric brake motor which presses a brake piston with its brake lining against a brake disk to generate a clamping force which holds the vehicle at a standstill. Such a parking brake is discussed in DE 103 61 042 B3, for example.

The brake disk is usually also acted upon by the hydraulic vehicle brake. In the case of intensive brake usage, the brake disk may reach high temperatures and may expand due to the heat. If the parking brake is operated in this state, the clamping force may decrease during the cooling down of the brake disk.

SUMMARY OF THE INVENTION

An object of the exemplary embodiments and/or exemplary methods of the present invention is to ensure, with the aid of simple measures, the proper function of a parking brake in a vehicle even at high brake disk temperatures.

According to the exemplary embodiments and/or exemplary methods of the present invention, this object may be achieved by the features described herein. The further descriptions herein describe advantageous refinements.

The method according to the present invention relates to a parking brake having a brake device for generating a setpoint clamping force. The brake device has, for example, an electromechanical design and may include an electric brake motor for electromechanically generating the setpoint clamping force. The clamping force is generated by a rotary motion of the rotor of the brake motor in that the rotary motion is transferred into an actuating motion of a final control element, via which a brake piston, which is the carrier of a brake lining, is pressed axially against a brake disk.

To be independent of the ascertainment of the brake disk temperature and to provide a sufficiently high clamping force for all brake disk temperatures, the engagement process according to the present invention for providing the clamping force which holds the vehicle is carried out as a function of the incline of the roadway where the vehicle is parked. If the roadway incline exceeds an associated threshold value, a reengagement process for regenerating the clamping force is carried out after a defined time period has elapsed, which may be by operating the electric brake motor, but also by operating any other brake device, if necessary, such as an additional brake device which may be the hydraulic vehicle brake, for example.

This mode of operation has various advantages. If, according to one embodiment, a reengagement process is only carried out upon exceedance of the roadway incline threshold value, but not if the roadway incline is below the associated threshold value, the number of reengagement processes may be significantly reduced so that there is less stress on the components of the parking brake. At the same time, it is not necessary to measure the brake disk temperature or to estimate it from a temperature model, whereby the costs for a necessary sensor system are also reduced. Despite the reduced costs, the protection against an accidental rolling away of the vehicle is sufficiently high.

It may be advantageous to differentiate between more than two gradient ranges, e.g., three different gradient ranges, different measures for operating the parking brake being carried out in every gradient range. If the roadway incline is below a first lower threshold value, which may, for example, have a 5% incline, a reengagement process may be omitted, even if the brake disk temperature is high. In this case, the incline is so small that, in the event of a decrease in the clamping force due to the cooling down of the brake disk, there is no risk of the vehicle starting to move.

If, however, the roadway incline is between the lower, first, threshold value and an upper, second, threshold value, it may be additionally monitored whether the vehicle starts moving after the termination of the engagement process for generating the setpoint clamping force. The time period, during which the monitoring after the termination of the engagement process is carried out, is either fixed or a function of one or multiple state or characteristic variables of the parking brake. In the case that a hydraulic vehicle brake acting during normal braking operation also acts on the brake disk, which is also acted on by the parking brake, this state variable may be the hydraulic pressure of the vehicle brake which generates an additional hydraulic clamping force which adds to the electromechanically generated brake force of the electric brake motor. The hydraulic brake force is created in that the driver operates the brake pedal while the vehicle is at a standstill and the parking brake is being operated, or in that a hydraulically increased brake pressure is generated in any other way. The higher the hydraulic pressure, the shorter may the time period be during which, after the termination of the first engagement process, the electric brake motor monitors whether the vehicle starts moving. If this occurs, e.g., due to the cooling down of the brake disk and the decrease in the electromechanically generated clamping force, the electric brake motor is operated again, thus reengaging the parking brake.

According to one alternative embodiment, it may also be advantageous to carry out a reengagement process by operating the electric brake motor, in general after a time period has elapsed, which is a function of a state or a characteristic variable.

If the roadway incline is above the second, upper incline threshold value, the vehicle movement is also monitored for a defined time period after the termination of the first engagement process for reaching the setpoint clamping force, and a reengagement process is carried out by repeatedly operating the electric brake motor, if a vehicle movement is determined. The time period which follows the termination of the first engagement process is in this case advantageously not defined as a function of a state or a characteristic variable, but as a fixed time period.

In the case of exceedance of the upper incline threshold value, it may also be advantageous according to one alternative embodiment to carry out a reengagement process in any case after the time period has elapsed, i.e., also in the case that no vehicle movement is determined during the monitored time period.

In addition to the advantage that according to the method according to the present invention, no temperature information is necessary, the method has the further advantage that there is no dependency on a trailer load towed by the vehicle. The threshold values for the time periods, during which the application of the clamping force is monitored, and/or for the road incline threshold values are basically independent of a trailer operation.

According to one alternative embodiment, it is, however, advantageous to use the information of a trailer detection and to modify the threshold values for the time periods and/or the road inclines in the case that a trailer is towed by the vehicle.

It may be advantageous to establish, as a function of one or more state or characteristic variables of the parking brake, the duration of the time periods, during which it is monitored or awaited after the engagement of the parking brake. This applies, if necessary, to all time periods, i.e., to every time period assigned to a certain range of the angle of inclination. Furthermore, it may be advantageous to also establish the threshold values for the road inclines as a function of one or more state or characteristic variables of the parking brake.

Alternatively, the threshold values for the road inclines are set to fixed values.

The method according to the present invention runs in a regulating or control unit in the vehicle, which may be an integral part of the parking brake.

Additional advantages and advantageous embodiments are derived from the other descriptions herein, the description of the figures, and the drawings.

DETAILED DESCRIPTION

Figure 1:
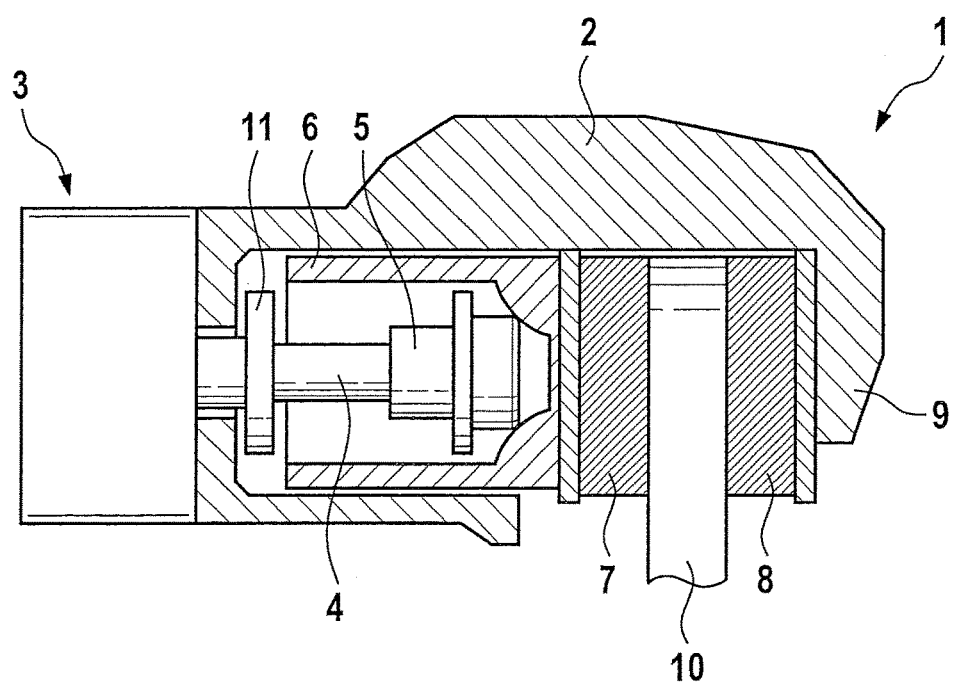
FIG. 1 shows a section through an electromechanical parking brake for a vehicle having an electric brake motor for generating a clamping force which holds the vehicle.

FIG. 1 shows an electromechanical parking brake 1 in a vehicle, a clamping force which holds the vehicle at a standstill being generatable via the parking brake. Parking brake 1 has a brake caliper 2 having a caliper unit 9 which reaches over brake disk 10. A brake motor 3, which is designed as an electric motor and which rotatingly drives a spindle 4 on which a spindle component 5 is axially installed, is used as the final control element of parking brake 1. Spindle component 5 is axially adjusted when spindle 4 rotates. Spindle component 5 moves within a brake piston 6, which is a carrier of a brake lining 7 which is pressed by brake piston 6 against brake disk 10. Another brake lining 8, which is held in a fixed position on caliper unit 9, is situated on the opposite side of brake disk 10.

Within brake piston 6, spindle component 5 is able to move axially forward in the direction of the brake disk when spindle 4 rotates, or it is able to move axially rearward until a stop 11 is reached when spindle 4 rotates in the opposite direction. In order to generate a desirable setpoint clamping force, spindle component 5 acts on the inner front side of brake piston 6, so that brake piston 6, which is installed axially displaceably in parking brake 1, is pressed against the facing front side of brake disk 10 having brake lining 7.

Figure 2:
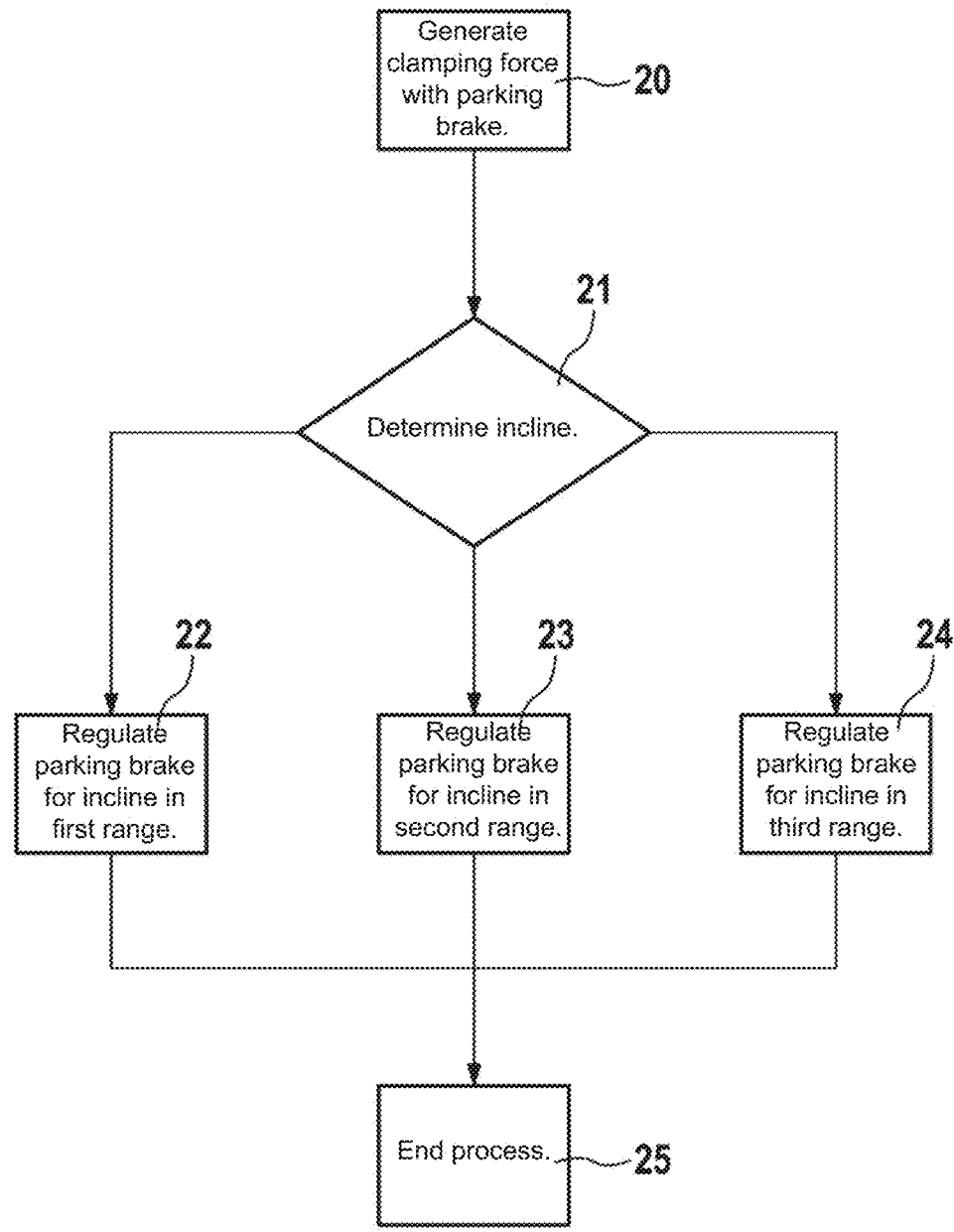
FIG. 2 shows a flow chart having method steps for providing the clamping force generated by the parking brake.

In FIG. 2, a flow chart for providing the clamping force applied by the parking brake is illustrated. In the method, reengagement takes place after a defined time period as a function of the incline of the roadway where the vehicle is parked.

In method step 20, the method is initially started and an electromechanical clamping force is generated by operating the electric brake motor after the vehicle is parked. Upon reaching a setpoint clamping force, the process continues in next method step 21 in which the incline of the roadway, where the vehicle is parked, is determined on the basis of information ascertained by sensors.

In the further course, the process branches to different branches depending on the height of the instantaneous road incline. In the exemplary embodiment, it is differentiated between three road incline ranges, of which the first road incline range is between 0° and a lower, first threshold value of, for example, 5°; the second incline range is between the lower, first threshold value and an upper, second threshold value of, for example, 10°; and the third incline range is above the upper, second threshold value. Three process blocks 22, 23, and 24 are assigned to the three road incline ranges in the further course.

If it is determined in the query according to method step 21 that the instantaneous road incline is in the first incline range, the process continues in method step 22, and the regulating or control unit, via which the functions of the parking brake are controlled, remains active only for a defined short time period of ten seconds, for example; however, no other action takes place during this time period. Neither a sudden movement of the vehicle is monitored nor a repeated engagement process is carried out. In one alternative embodiment, the vehicle movement may be monitored during the time period and, if necessary, a repeated engagement process may be carried out. After the time period has elapsed, the process continues in final method step 25 and the method is terminated for this cycle.

If the query in step 21 shows that the instantaneous road incline is in the middle range, the process continues in method step 23 in which it is monitored for a longer time period whether the vehicle starts moving accidentally after the first engagement process for reaching the setpoint clamping force. The time period is, for example, in a range between 10 minutes and 35 minutes and depends, in turn, on the hydraulic pressure of the regular hydraulic vehicle brake which is operated by the driver or via a control unit during normal braking operation to brake the vehicle. The hydraulic pressure also acts on the brake piston which is the carrier of the brake lining and is pressed against the brake disk. The hydraulic pressure prevailing at the time of the first engagement results in a hydraulic clamping force which adds to the electromechanical brake force generated via the electric brake motor. In the case of a high hydraulic pressure, the time period of the monitoring after the first engagement process may be reduced; in the case of a lower hydraulic pressure, however, the time period of the monitoring is increased.

If, however, it is determined during the monitoring time period that the vehicle has accidentally moved, a reengagement process is carried out by operating the electric brake motor to provide additional electromechanical clamping force. After the time period has elapsed, the process continues in method step 25; the method is terminated for this cycle.

If it is determined in method step 21 that the roadway incline is above the second upper threshold value, the process continues in method step 24, according to which it is awaited for a defined time period, which advantageously does not depend on the hydraulic pilot pressure but is defined as a fixed value, after the first engagement process for reaching the setpoint clamping force, and the parking brake is automatically reengaged after the time period has elapsed by operating the electric brake motor. The time period is, for example, 5 minutes; after this time period has elapsed, the parking brake is always reengaged.

Even after the reengagement, it may be monitored for a further time period of an additional 10 minutes, for example, whether the vehicle starts moving, and the parking brake may be reengaged again, if necessary, by operating the electric brake motor. If necessary, the vehicle movement is also monitored during the first time period, which directly follows the first engagement process for reaching the setpoint clamping force, and a reengagement process is carried out immediately to prevent the vehicle from rolling away.

Following method step 24, the process continues in step 25 and the method is terminated for this cycle.

What is claimed is:

1. A method for providing a clamping force generated by a parking brake and a brake device, the method comprising:
   measuring a roadway incline, wherein the measured roadway incline is categorized in one of three distinct gradient ranges; and
   selectively performing different control operations of the parking brake for the three distinct gradient ranges, wherein at least a time period for monitoring an unintended movement of the vehicle is varied for the three distinct gradient ranges.

2. A method for providing a clamping force generated by a parking brake and a brake device, the method comprising:
   performing a first engagement process to generate the clamping force by the parking brake in a vehicle while the vehicle is parked;
   after the first engagement process, determining a roadway incline; and
   after determining the roadway incline, performing a reengagement process by the parking brake for regenerating the clamping force,
   wherein the reengagement process is performed after a defined time period has elapsed from the first engagement process, wherein a length of the defined time period is a function of the determined roadway incline.

3. The method of claim 2, wherein the clamping force is at least partially generated by an electromechanical brake device having an electric brake motor.

4. The method of claim 3, wherein the electric brake motor is operated again during the reengagement process.

5. The method of claim 2, further comprising:
   performing, if the roadway incline exceeds a threshold value, a reengagement process for regenerating the clamping force after a defined time period has elapsed, wherein if the roadway incline does not exceed the threshold value, no reengagement process takes place.

6. The method of claim 2, wherein the roadway incline is differentiated between at least three gradient ranges, a reengagement process being performed in an upper gradient range of the at least three gradient ranges.

7. The method of claim 2, wherein the reengagement process is performed after a fixedly predefined time period has elapsed.

8. The method of claim 2, wherein the time period, after which the reengagement process is performed, is a function of a state or characteristic variable of the parking brake.

9. The method of claim 8, wherein the elapse of the time period after the reengagement process is performed is a function of the hydraulic pressure of the hydraulic vehicle brake.

10. The method of claim 2, wherein the parking brake is equipped with an additional brake device for generating an additional clamping force.

11. The method of claim 10, wherein the additional brake device is a hydraulic vehicle brake.

12. The method of claim 2, wherein the reengagement process is performed only if a vehicle movement is determined.

13. The method of claim 2, wherein the performance of the reengagement process is independent of a temperature of the parking brake.

14. The method of claim 2, wherein the length of the defined time period has a first value for a first range of values of the determined roadway incline, and a second value different from the first value for a second range of values of the determined roadway include.

15. The method of claim 14, wherein the reengagement process is omitted for a third range of values of the determined roadway incline different from the first and second ranges of values of the determined roadway incline.

16. The method of claim 2, further comprising:
   monitoring, during the defined time period, for movement of the vehicle;
   in response to detecting the movement during the predefined time period, performing an intervening reengagement process by the parking brake for regenerating the clamping force; and
   in response to detecting no movement during the predefined time period, omitting the intervening reengagement process by the parking brake.

17. The method of claim 2, wherein the length of the defined time period is additionally a function of a hydraulic pressure of a hydraulic vehicle brake, separate from the parking brake, during the first engagement process.

18. A regulating or control unit for providing a clamping force generated by a parking brake and a brake device, comprising:
   a determining arrangement to determine a roadway incline after a first engagement process to generate the clamping force by the parking brake in a vehicle while the vehicle is parked; and
   a process arrangement for:
      after determining the roadway incline, performing, if the roadway incline exceeds a threshold value, a reengagement process by the parking brake for regenerating the clamping force after a defined time period has elapsed, wherein if the roadway incline does not exceed the threshold value, no reengagement process takes place,
   wherein the roadway incline is differentiated between at least three gradient ranges, the reengagement process being performed in an upper gradient range of the at least three gradient ranges and omitted in a lowest gradient range of the at least three gradient ranges.

19. The regulating or control unit of claim 18, wherein the performance of the reengagement process is independent of a temperature of the parking brake.

20. A parking brake, comprising:
   a regulating or control unit for providing a clamping force generated by a parking brake and a brake device, including:
      a determining arrangement to determine a roadway incline after a first engagement process to generate the clamping force by the parking brake in a vehicle while the vehicle is parked; and a process arrangement for performing, after determining the roadway incline, and if the roadway incline exceeds a threshold value, a reengagement process for regenerating the clamping force after a defined time period has elapsed, wherein if the roadway incline does not exceed the threshold value, no reengagement process takes place, wherein the roadway incline is differentiated between at least three gradient ranges, the reengagement process being performed in an upper gradient range of the at least three gradient ranges and omitted in a lowest gradient range of the at least three gradient ranges.

21. The parking brake of claim 20, wherein the performance of the reengagement process is independent of a temperature of the parking brake.

* * * * *